United States Patent [19]

Huggins et al.

[11] 4,303,623
[45] Dec. 1, 1981

[54] SEPARATION OF TRACE MOLYBDENUM FROM TUNGSTATE SOLUTIONS

[75] Inventors: Dale K. Huggins; Paul B. Queneau, both of Golden; Robert C. Ziegler, Lakewood; Leo W. Beckstead; Robert F. Hogsett, both of Arvada, all of Colo.

[73] Assignee: Amax Inc., Greenwich, Conn.

[21] Appl. No.: 225,915

[22] Filed: Jan. 19, 1981

[51] Int. Cl.$^3$ .................... C01G 39/00; C01G 41/00
[52] U.S. Cl. ................................ 423/55; 423/58; 423/561 R
[58] Field of Search .................. 423/53, 55, 58, 561 R

[56] References Cited

U.S. PATENT DOCUMENTS

| | | | |
|---|---|---|---|
| 2,339,888 | 1/1944 | Smith | 423/58 |
| 3,173,754 | 3/1965 | Kurtak | 423/57 |
| 3,939,245 | 2/1976 | Bellingham | 423/55 |
| 3,969,484 | 7/1976 | Onozaki et al. | 423/561 R |

Primary Examiner—Herbert T. Carter
Attorney, Agent, or Firm—Michael A. Ciomek

[57] ABSTRACT

Dissolved molybdenum is removed from sodium tungstate solutions by adding sulfuric acid to lower the pH value of the solution to between about 8 and about 5, adding to the sodium tungstate solution a water-soluble sulfide in an amount of at least 0.5 gram per liter (gpl) in excess of that required to precipitate as sulfides molybdenum and certain other metals, then lowering the pH value of the sodium tungstate solution to between about 4.0 and about 1.5 as rapidly as possible with sulfuric acid in such a way as to precipitate molybdenum trisulfide while minimizing co-precipitation of tungsten.

27 Claims, 1 Drawing Figure

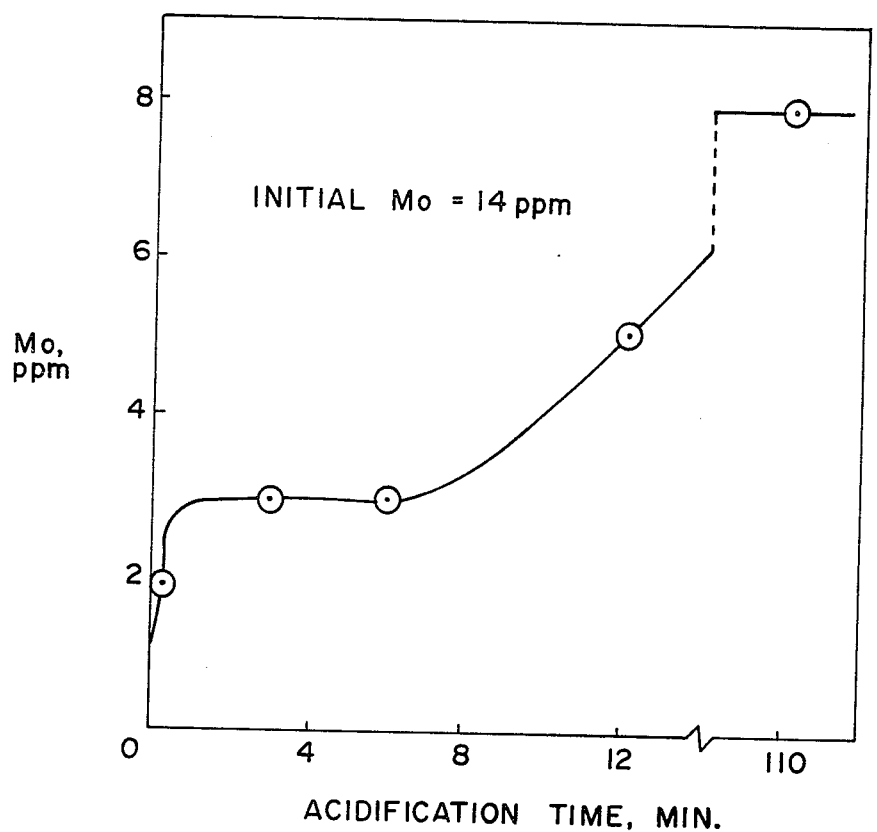

SEPARATION OF TRACE MOLYBDENUM FROM TUNGSTATE SOLUTIONS

FIELD OF THE INVENTION

The present invention relates to the hydrometallurgy of tungsten bearing minerals and, more particularly, to the removal of molybdenum from sodium tungstate solutions.

BACKGROUND OF THE INVENTION

High-purity tungsten and tungsten compounds are produced by digesting scheelite and wolframite to form sodium tungstate solutions which are purified and treated to form ammonium paratungstate, a precursor for producing other tungsten compounds and metallic tungsten. Molybdenum is often associated with scheelite and wolframite and must be removed from the tungstate solution in order to provide commercially acceptable tungsten products.

Processes are known for precipitating molybdenum trisulfide from sodium tungstate solutions and are generally directed to tungstate solutions having 500 or more parts per million (ppm) molybdenum. Such solutions can be more easily treated than solutions containing less than 100 ppm or even 50 ppm molybdenum, particularly when traces of organic substances are also present. The present invention allows the treatment of solutions containing 15 ppm molybdenum as well as those solutions containing as much as 20,000 ppm molybdenum.

PRIOR ART

A process for removing molybdenum from sodium tungstate solutions is described in U.S. Pat. No. 3,173,754. This patent teaches that the pH value of the sodium tungstate solution must be adjusted to a value above 8 before adding at least 170% of the stoichiometric amount of an alkali metal sulfide required to convert all molybdate ions to thiomolybdate ions. After formation of the thiomolybdate ion, the tungstate solution is acidified to precipitate molybdenum trisulfide.

DRAWING

The FIGURE depicts the relationship between the time used for acidification and the final molybdenum content in the product solution.

SUMMARY OF THE INVENTION

Generally speaking, the present invention relates to a process for precipitating molybdenum as molybdenum trisulfide from sodium tungstate solutions. A sodium tungstate solution containing dissolved molybdenum and having a pH value above about 8 is treated with sulfuric acid to adjust the pH value thereof to between about 8 and about 5. The resulting solution is maintained at a temperature of at least about 50° C. and at least one water-soluble sulfide is added to the pH adjusted solution to provide and maintain a sulfide ion concentration of at least about 0.5 gram per liter (gpl) in excess of that required to form sulfides of molybdenum and other metal impurities which form insoluble sulfides. The sulfidized solution is acidified through the pH range between about 5 and about 4.5 as rapidly as possible to a pH value between about 4 and about 1.5 to precipitate molybdenum trisulfide to provide a product solution containing less than about 3 parts per million (ppm) molybdenum.

DETAILED DESCRIPTION OF THE INVENTION

Scheelite and wolframite are frequently processed to produce ammonium paratungstate, which is a precursor for the production of commercially pure tungsten and tungsten compounds. Concentrates of scheelite and wolframite are digested with sodium carbonate or sodium hydroxide to form sodium tungstate solutions which are treated for silica, phosphate, fluoride and molybdenum removal. The tungstate ions are then loaded on an organic extractant and then stripped therefrom with ammonium hydroxide to form an ammonium tungstate solution. Ammonium paratungstate is recovered from the ammonium tungstate solution by crystallization.

As noted above, scheelite and wolframite are digested with sodium carbonate and sodium hydroxide solutions to produce sodium tungstate solutions. Processes for digesting scheelite and wolframite are disclosed and claimed in copending applications, U.S. Ser. Nos. 225,914, 225,913, and 225,910 filed on even dates herewith. These applications are incorporated herein by reference. The sodium tungstate solution is then treated for silica, fluoride and phosphate removal as more fully described in U.S. patent application Ser. No. 225,913, (filed on even date herewith) which is incorporated herein by reference.

Digestion of scheelite and wolframite with sodium carbonate and sodium hydroxide solutions produces pregnant solutions containing 50 to 300 gpl tungsten (advantageously, between about 100 gpl and about 200 gpl tungsten), between about 10 parts per million (ppm) and 10,000 ppm molybdenum (generally, between about 20 ppm and about 2,000 ppm molybdenum) and other metal impurities, such as lead, copper, antimony, bismuth, zinc and arsenic, all of which can be wholly or partially coprecipitated with molybdenum trisulfide.

Flotation concentrates often contain significant amounts of residual flotation reagents and are advantageously treated by roasting to burn off the residual flotation reagents. If the concentrate fed to the digestion step has not been treated to destroy residual flotation reagents, the alkali metal tungstate solution is treated with an oxidizing reagent to oxidize substantially all of any residual flotation reagents. Hydrogen peroxide, ozone, and any other strong oxidant are effective in oxidizing residual flotation reagents. For example, at least about 5 milliliters (ml) of 30% hydrogen peroxide per liter of alkali metal tungstate solution can be effective in oxidizing the flotation reagents. In the absence of oxidizing the residual flotation reagents, the reagents can sequester the molybdenum ions in the tungstate solution, and the sequestered molybdenum may not be completely precipitated upon subsequent sulfidization and acidification. In addition, the presence of flotation reagents can interfere with subsequent purification of the tungstate solution, particularly during the solvent extraction treatment.

An important aspect of the present invention is the adjustment of the pH of the sodium tungstate solution to a pH value between about 8 and about 5, advantageously between about 6.5 and about 5.5, prior to sulfidization. Adjustment of the sodium tungstate liquor to pH values within the foregoing ranges with sulfuric acid prior to sulfidization insures lower molybdenum contents in the product liquor. An advantageous feature of adjusting the pH value to between about 6.5 and about 5.5 is that any sodium carbonate present is decomposed causing an evolution of carbon dioxide gas. This facilitates recovery of hydrogen sulfide gas evolved in subsequent steps since the hydrogen sulfide gas is not diluted by carbon dioxide. Carbon dioxide elimination during the pH adjustment prior to sulfidization of the solution also enhances molybdenum trisulfide precipitation by avoiding the sweeping out of hydrogen sulfide gas from the solution by carbon dioxide gas which would otherwise be evolved during the acidification of the tungstate solution to precipitate molybdenum trisulfide. The carbon dioxide evolved during this pH adjustment step is substantially free of hydrogen sulfide and can be vented to the atmosphere or recovered for other uses. Adjustment of pH prior to sulfidization can be conducted at any temperature above the freezing point but somewhat elevated temperatures, e.g. 35° C. to 90° C. or higher, are advantageously employed to insure substantially complete evolution of carbon dioxide.

The sodium tungstate solution having a pH value between about 8 and about 5 is then sulfidized by adding at least one water-soluble sulfide selected from the group consisting of sodium sulfide, sodium hydrosulfide, potassium sulfide, potassium hydrosulfide, ammonium sulfide and hydrogen sulfide. The water-soluble sulfide is added to the sodium tungstate solution in an amount to provide and maintain a sulfide ion concentration of at least 0.5 gpl in excess of the amount required to form sulfides of molybdenum and any other sulfide-forming impurities. Sulfide ion concentrations below this amount result in incomplete molybdenum precipitation while sulfide concentrations in excess of about 3 gpl result in excessive hydrogen sulfide evolution during subsequent acidification. The excess sulfide ion concentrations in accordance with the process of the present invention insure substantially complete removal of molybdenum from sodium tungstate solutions, even in the presence of fluoride ions which can complex the molybdenum ions and thereby interfere with the precipitation of molybdenum trisulfide.

Advantageously, the water-soluble sulfide is added to the sodium tungstate solution in amounts to provide sulfide ion concentrations between about 1 gpl and about 2 gpl in excess of that required to form sulfides of molybdenum and other metal impurities. Water-soluble sulfide additions within the foregoing narrow ranges insure substantially complete precipitation of molybdenum while minimizing precipitation of tungsten values and the evolution of hydrogen sulfide during acidification.

The sodium tungstate solution is sulfidized at room temperature or above, e.g., 50° C. to 90° C., or even higher. Sulfidization at temperatures below about 50° C. can result in slow or incomplete sulfidizing reactions. Higher sulfidizing temperatures insure rapid and complete sulfidization reactions but if the sulfidizing temperature is too high, e.g., above about 90° C., hydrogen sulfide is evolved lowering the sulfide concentration in the sodium tungstate solution and precautions must be taken to maintain the sulfide ion concentration within the ranges described hereinbefore. Sulfide ion concentration can be maintained by continually adding fresh amounts of water-soluble sulfide to the sodium tungstate solution or by providing an appropriate hydrogen sulfide overpressure. Ordinarily, the costs entailed in conducting the sulfidizing reaction in an autoclave at temperatures above 90° C. are not warranted because the sulfidizing reaction proceeds at commercially acceptable rates at temperatures between about 50° C. and about 90° C. In order to insure the completeness of the sulfidizing reactions, the sulfidized sodium tungstate solution is held at temperature for about one-quarter hour to 2 hours, although even such holding times are not required if the sulfidized sodium tungstate is acidified by the heel technique as described hereinafter.

Molybdenum is precipitated from sulfidized sodium tungstate solution by acidification with sulfuric acid to a pH value between about 4 and about 1.5, advantageously to a pH value between about 3.5 and 2.5 and most advantageously to a pH value between about 3.2 and about 2.8. Upon acidification to these pH values molybdenum trisulfide is precipitated and hydrogen sulfide is evolved. Acidification to pH values within the foregoing ranges insures substantially complete precipitation of molybdenum trisulfide (e.g., the product liquor contains less than about 3 ppm molybdenum and even less than 1 ppm). Acidification to lower pH values can cause excessive amounts of tungsten to be coprecipitated with the molybdenum trisulfide. Acidification can be conducted at any temperature above the freezing point. As noted hereinabove, hydrogen sulfide is evolved during this acidification and because prior acidification eliminates substantially all the carbon dioxide contained in the tungstate solution, recovery of hydrogen sulfide is greatly facilitated.

A highly important aspect of the present invention is that the acidification to precipitate molybdenum trisulfide should be conducted as rapidly as possible through the pH range between about 5 and about 4.5. By acidification through this pH range as rapidly as possible surprisingly low molybdenum contents can be produced in the product liquor. In order to achieve the beneficial effects of rapid acidification, the acid should be added at a rate to insure that the pH value of the sodium tungstate solution is lowered to the precipitation pH value in less than about 8 minutes, and more advantageously in less than about 6 minutes.

Another important aspect of the molybdenum trisulfide precipitation stage is the use of small but effective amounts of previously precipitated molybdenum trisulfide to seed the precipitation of the molybdenum trisulfide. The amount of molybdenum trisulfide seed material can be as low as about 0.1% solids by weight but is advantageously above about 0.25% solids by weight. The use of molybdenum trisulfide seed provides a molybdenum trisulfide product that is more readily filterable, and assists in substantially complete precipitation of molybdenum from the sodium tungstate liquor. When using the heel solution as described hereinbelow, molybdenum trisulfide precipitate can be periodically removed in order to provide a substantially constant volume of heel solution having the proper solids content.

Rapid acidification through the pH range of about 5 to 4.5 can be accomplished by using a small portion of sodium tungstate liquor containing suspended molybdenum trisulfide from previous molybdenum trisulfide precipitation steps, i.e., a heel solution. The heel solution may have a pH value between about 4 and about 1.5, and sulfuric acid and sulfidized sodium tungstate solution is added thereto at a rate to maintain the pH value of the heel solution between said range. Use of this heel technique minimizes or avoids operating problems, such as foaming, when it is attempted to rapidly acidify the whole volume of sodium tungstate solution. Sulfided sodium tungstate solution and acid are simultaneously fed to the heel solution at rates to maintain the heel solution at the desired pH value ranges. Use of the heel technique in acidifying the sulfided sodium tungstate solution consistently provides product liquors containing less than about 1 ppm molybdenum. The heel liquor can be derived from prior molybdenum trisulfide precipitation operations, or a fresh heel solution, can be prepared by precipitating molybdenum trisulfide from a sodium tungstate solution as described hereinbefore. In order to achieve commercially acceptable molybdenum contents in the product solution the dissolved molybdenum content in the heel liquor is maintained at less than 10 ppm and advantageously less than about 3 ppm. Tests have shown that heel liquors from previous precipitation operations equilibrate at a value of about 1 ppm in the product solution provided that the procedures outlines hereinabove are followed. The volume of the heel solution should be sufficiently large to avoid significant variations in the pH of the heel solutions.

Whether an acid is fed to a sulfidized sodium tungstate solution or the sulfidized sodium tungstate solution is fed to a heel solution, good mixing should be employed. Mixing can be accomplished by well-known means. Good mixing facilitates rapid acidification through the pH range of 5 to 4.5 and provides a product that is more readily filterable.

Although the pH adjustment and the acidification steps of the process in accordance with the present invention have become described as using sulfuric acid, those skilled in the art will readily recognize that other non-oxidizing mineral acids, such as hydrochloric acid can be employed in these steps.

In order to give those skilled in the art a better understanding of the present invention, the following illustrative examples are given:

EXAMPLE 1

This example demonstrates that low molybdenum concentrations in the product solution can be obtained by sulfidizing sodium tungstate solutions having pH values between about 8 and 5.

Sodium tungstate solutions were obtained by digesting scheelite flotation concentrates in a 15-gallon autoclave at a temperature of 230° C. for two hours using 1.2 kilograms of sodium carbonate per kilogram of $WO_3$ at an initial sodium carbonate concentration of 160 gpl. The wash-water diluted pregnant liquor typically contained between 15 ppm and 20 ppm molybdenum and between about 60 gpl and about 80 gpl $WO_3$.

Molybdenum trisulfide precipitation was conducted in a two-liter Pyrex resin reaction flask equipped with a Teflon beater-type stirrer, thermometer, pH electrode, reflux condensor and a burette for acid addition. Constant temperatures were maintained with a Glas-Col Electric heating mantle. The amount of gas evolved during acidification was measured with a wet test meter. The reagent-grade sulfuric acid (96%) was employed for pH adjustment and for precipitation of molybdenum trisulfide. Filtration of the molybdenum trisulfide precipitate was performed with a Buchner funnel and two Whatman No.-42 papers. The funnel was stoppered to permit either pressure or vacuum filtration. Both precipitation and filtration of molybdenum trisulfide were performed under an atmosphere of nitrogen.

Four samples of the sodium tungstate solution containing 15 ppm to 20 ppm molybedum were treated with 96% sulfuric acid to the pH values shown in Table I. Solid sodium sulfide ($Na_2S.9H_2O$) was added to the neutralized sodium tungstate solution to provide a sulfide ion concentration of 2 gpl and sufficient acid was then added to return the solution to the indicated pH prior to acidification for precipitation of molybdenum trisulfide. The sulfidized sodium tungstate solutions were then acidified by the heel technique. The initial heel was generated by conventional molybdenum trisulfide procedures and contained 5 ppm molybdenum and had a pH value of about 2.5. Forty percent (40%) of this solution was used as a heel liquor. The sulfidized sodium tungstate solution and 96% sulfuric acid were continuously added to the heel to maintain the pH value thereof between about 2.5 and 3. The results of these tests are reported in Table I.

These data show that addition of sulfide reagent at pH 8 or less, (i.e., pH 8 to 5) results in excellent removal of molybdenum upon precipitation of molybdenum trisulfide by the heel technique, (i.e., quenching).

TABLE I

| pH of Sulfide Addition | pH just before quench | Final Mo. ppm |
| --- | --- | --- |
| 5 | 5 | 1.1 |
| 6 | 6 | 1.0 |
| 7 | 7 | 1.0 |
| 8 | 8 | 1.0 |

EXAMPLE 2

This example confirms that rapid acidification is effective in producing low final molybdenum concentrations in the product solution.

A sodium tungstate solution prepared in the manner described in Example 1 was acidified to a pH value of 6 and this solution was then sulfidized with sodium sulfide to provide a sulfide ion concentration of 2 gpl. The solution was held at 85° C. for one hour. Concentrated sulfuric acid was then added to the sulfidized sodium tungstate solution to obtain a final pH value 2.5. The test was repeated several times using various rates of acid addition to provide total acidification times of less than 1 minute to up to 110 minutes. The results of these tests are shown in the FIGURE.

Reference to the FIGURE clearly demonstates that the most rapid acidification times ensure the lowest final molybdenum contents in the product solution.

EXAMPLE 3

This example demonstrates the effects of the final pH value to which the sodium tungstate solution is lowered. A sodium tungstate solution containing 20 ppm molybdenum was treated with sulfuric acid to adjust its pH value to about 6 and sodium sulfide in an amount to provide a sulfide ion concentration of 2 gpl was added thereto. The sulfidized sodium tungstate solution was then acidified to various pH values using the heel technique described in Example 1. The results of these tests are reported in Table II. The data in Table II confirm that the lower the final pH value upon acidification the greater the losses of $WO_3$ to the molybdenum trisulfide precipitate.

TABLE II

| Final pH | Product Liquor, ppm Mo | MoS3 Ppt, % Mo | MoS3 Ppt, % WO3 | % of Initial WO3 Reporting to Washed MoS3 Cake |
|---|---|---|---|---|
| 1.5 | 1.1 | 1.3 | 54 | 0.89 |
| 2.0 | 1.0 | 2.9 | 21 | 0.13 |
| 2.5 | 1.0 | 4.1 | 41 | 0.19 |
| 3.0 | 1.0 | 4.2 | 18 | 0.08 |
| 3.5 | 2.7 | 4.3 | 7.9 | 0.02 |

EXAMPLE 4

This example demonstrates that lower molybdenum concentrations in the product liquor can be obtained by employing the heel technique for acidifying the sulfide-treated sodium tungstate solution.

A heel solution was prepared by heating one liter of sodium tungstate solution derived as described in Example 1, plus 5 milliliters (ml) of hydrogen peroxide (30%) at 85° C. for 15 minutes. The oxidized sodium tungstate solution was sulfidized by adding 5.0 grams of sodium sulfide and the sulfidized solution was held at 85° C. for 1 hour. Concentrated sulfuric acid (96%) was added to the sulfidized solution in an amount to provide a pH value of 2.5 to precipitate molybdenum trisulfide. The precipitated molybdenum trisulfide was permitted to settle for one hour and 750 ml of supernatant liquor was removed and filtered. The remaining slurry of 250 ml constituted the starting heel solution for subsequent tests.

Sodium tungstate feed solution in an amount of one liter plus 5 ml of hydrogen peroxide (30%) was heated at 85° C. for 15 minutes. Concentrated sulfuric acid was then added to the oxidized solution in an amount to adjust the acidity of the oxidized solution to pH 6. Sodium sulfide in an amount of 5 grams was then added to the pH-adjusted solution, and the sulfidized solution was held for one hour at 85° C. The sulfidized feed solution was then pumped into the heel solution prepared as described hereinabove and maintained at pH 2.5 and at a temperature of 85° C. The results of these tests are reported in Table III.

Reference to the results in Table III confirm that molybdenum contents of less than 2 ppm in a product liquor were consistently obtained using the heel technique as compared to the conventional precipitation technique used in preparing the initial heel solution also shown in Table III.

TABLE III

| Text | Mo Conc. (ppm) Using Conventional Technique (i.e., Preparation of Heel) | Mo Conc (ppm) Using Quench Technique And Prepared Heel Liquor |
|---|---|---|
| 1 | 2.8 | 1.4 |
| 2 | 2.9 | 1.8 |
| 3 | 3.4 | 1.7 |
| 4 | 5.0 | 1.9 |
| 5 | 3.4 | 1.2 |
| 6 | 4.3 | 1.6 |
| 7 | 3.6 | 1.5 |
| 8 | 5.0 | 1.7 |
| 9 | 5.4 | 1.8 |
| 10* | 0 | 1.0 |

*Heel was prepared by acidifying de-mineralized water to pH 2.5.

EXAMPLE 5

This example demonstrates the use of the heel technique with repeated use of the product slurry from previous precipitations.

The initial heel solution was prepared as described in Example 4. Sodium tungstate feed solution was treated as described in Example 4 and pumped directly in to the heel under the conditions described in Example 4. The resulting slurry was held for one hour at 2.5 pH at 85° C. with stirring. Thereafter the slurry was filtered leaving 655 ml as a heel for the next cycle. The results of this test are reported in Table IV. The results in Table IV show that surprisingly low molybdenum concentrations in the product liquor can be obtained after about 5 cycles. After the 5th cycle, the molybdenum concentration in the product liquor was approximately 1 ppm.

TABLE IV

| Cycle | | Heel Mo. Conc. (ppm) | Final Filtrate Mo Conc. (ppm) |
|---|---|---|---|
| 0 | Prepare Heel | — | — |
| 1 | Heel Technique | 5.0 | 2.1 |
| 2 | Heel Technique | 1.3 | 1.3 |
| 3 | Heel Technique | 1.5 | 1.3 |
| 4 | Heel Technique | 1.2 | 1.2 |
| 5 | Heel Technique | 1.2 | 1.3 |
| 6 | Heel Technique | 1.0 | 1.1 |
| 7 | Heel Technique | 1.2 | 1.1 |
| 8 | Heel Technique | 1.1 | 1.1 |
| 9 | Heel Technique | 1.1 | 1.2 |
| 10 | Heel Technique | 1.2 | 1.0 |
| 11 | Heel Technique | 1.2 | 1.0 |

Although the present invention has been described in conjunction with preferred embodiments, it is to be understood that modifications and variations thereto may be resorted to without departing from the spirit and scope of the invention as those skilled in the art will readily understand. Such modifications and variations are considered to be within the purview and scope of the invention and appended claims.

We claim:

1. A process for separating dissolved molybdenum values from a sodium tungstate solution having pH value above about 8 which comprises adjusting the pH value of the sodium tungstate solution with sulfuric acid to a pH value between about 8 and about 5, adding at least one water-soluble sulfide to the neutralized solution to provide and maintain a sulfide ion concentration of at least about 0.5 gram per liter in excess of that required to form sulfides of molybdenum and other metal impurities, and acidifying the sulfidized sodium tungstate solution through the pH range between about 5 and about 4.5 in less than about 8 minutes to a final pH value between about 4 and about 1.5 to precipitate molybdenum trisulfide and to provide a product solution containing less than about 3 ppm molybdenum.

2. The process as described in claim 1 wherein the sodium tungstate solution contains sodium carbonate and the pH value is adjusted to between about 6.5 and about 5.5 to evolve carbon dioxide.

3. The process as described in claim 1 wherein the water-soluble sulfide is added in an amount to provide a sulfide ion concentration less than about 3 gpl.

4. The process as described in claim 3 wherein the water-soluble sulfide is added to the sodium tungstate solution in an amount to provide a sulfide ion concentration between about 1 gpl and about 2 gpl in excess of that required to form sulfides of molybdenum and other metal impurities.

5. The process as described in claim 1 wherein the water-soluble sulfide is selected from the group consisting of sodium sulfide, sodium hydrosulfide, potassium sulfide, potassium hydrosulfide, ammonium sulfide and hydrogen sulfide.

6. The process as described in claim 1 wherein the solution to which the water-soluble sulfide has been added is held at a temperature between about 50° C. and about 90° C.

7. The process as described in claim 1 wherein the sodium tungstate solution containing the sulfide ion is maintained at a temperature above about 90° C. and a hydrogen sulfide overpressure is maintained to ensure that the sulfide ion concentration in the sodium tungstate solution is in excess of 0.5 gpl.

8. The process as described in claim 1 wherein the sulfidized sodium tungstate solution is held at temperature for between one-quarter hour and two hours.

9. The process as described in claim 1 wherein the sulfidized sodium tungstate solution is acidified to a final pH value between about 3.5 and about 2.5.

10. The process as described in claim 9 wherein the sulfidized sodium tungstate solution is acidified to a final pH value between about 3.2 and about 2.8.

11. The process as described in claim 1 wherein prior to acidification the sodium tungstate solution is provided with a molybdenum trisulfide seed material in an amount of at least 0.1 percent solids by weight.

12. The process as described in claim 11 wherein the seed material is present in an amount above about 0.25 percent solids by weight.

13. The process as described in claim 1 wherein a heel solution having a pH value equivalent to the final pH value is established and the sulfidized sodium tungstate solution and a sulfuric acid are fed to the heel solution at a rate to maintain the final pH value and to precipitate molybdenum trisulfide.

14. A process for separating dissolved molybdenum values from a sodium tungstate solution having a pH value above about 8 which comprises: adjusting the pH value of the sodium tungstate solution with sulfuric acid to a pH value between about 8 and about 5, adding at least one water soluble sulfide to the pH adjusted solution to provide and maintain a sulfide ion concentration of at least about 0.5 gram per liter in excess of that required to form sulfides of molybdenum and other impurities, establishing a heel solution having a pH value between about 4 and about 1.5, and feeding sulfuric acid and the sulfidized sodium tungstate solution to the heel solution at a rate to maintain the pH value of the heel solution between about 4 and about 1.5 and to precipitate molybdenum trisulfide.

15. The process as described in claim 14 wherein the sodium tungstate solution contains sodium carbonate and is adjusted to a pH value between about 6.5 and about 5.5 to evolve carbon dioxide.

16. The process as described in claim 15 wherein the water-soluble sulfide is added in an amount to provide a sulfide ion concentration less than about 3 gpl.

17. The process as described in claim 16 wherein the water-soluble sulfide is added to the sodium tungstate solution in an amount to provide a sulfide ion concentration between about 1 gpl and about 2 gpl in excess of that required to form sulfides of molybdenum and other metal impurities.

18. The process as described in claim 16 wherein the water-soluble sulfide is selected from the group consisting of sodium sulfide, sodium hydrosulfide, potassium sulfide, potassium hydrosulfide, ammonium sulfide and hydrogen sulfide.

19. In process as described in claim 18 wherein the sulfidized sodium tungstate solution is held at a temperature between about 50° C. and about 90° C.

20. The process as described in claim 14 wherein the sodium tungstate solution containing the sulfide ion is maintained at a temperature above about 90° C. and a hydrogen sulfide overpressure is maintained to insure that the sulfide ion concentration in the sodium tungstate solution is in excess of 0.5 gpl.

21. The process as described in claim 19 wherein the sulfidized sodium tungstate solution is held at temperature for between one-quarter hour and two hours.

22. The process as described in claim 18 wherein the sulfidized sodium tungstate solution is acidified to a final pH value between about 3.5 and about 2.5.

23. The process as described in claim 22 wherein the sulfidized sodium tungstate solution is acidified to a final pH value between about 3.2 and about 2.8.

24. The process as described in claim 22 wherein the heel solution contains molybdenum trisulfide seed material in an amount of at least about 0.1 percent solids by weight.

25. The process as described in claim 24 wherein the seed material is present in an amount above about 0.25 percent solids by weight.

26. A process for separating dissolved molybdenum values from a sodium tungstate solution having a pH value between about 8 and about 5 which comprises adding at least one water-soluble sulfide to the sodium tungstate solution to provide and maintain a sulfide ion concentration of at least about 0.5 gram per liter in excess of that required to form sulfides of molybdenum and other metal impurities, and acidifying the sulfidized sodium tungstate solution through the pH range between about 5 and about 4.5 in less than about 8 minutes to a final pH value between about 4 and about 1.5 to precipitate molybdenum trisulfide and to provide a product solution containing less than about 3 ppm molybdenum.

27. A process for separating dissolved molybdenum values from a sodium tungstate solution having a pH value between about 8 and about 5 which comprises adding at least one water-soluble sulfide to the sodium tungstate solution to provide and maintain a sulfide ion concentration of at least about 0.5 gram per liter in excess of that required to form sulfides of molybdenum and other impurities, establishing a heel solution having a pH value between about 4 and about 1.5, and feeding sulfuric acid and the sulfidized sodium tungstate solution to the heel solution at a rate to maintain the pH value of the heel solution between about 4 and about 1.5 and to precipitate molybdenum trisulfide.

* * * * *